United States Patent
Lee et al.

(10) Patent No.: US 10,444,921 B2
(45) Date of Patent: Oct. 15, 2019

(54) CAPACITIVE SENSING DEVICE AND DETECTION METHOD FOR AN IRREGULAR CONDUCTIVE MATTER IN A TOUCH EVENT

(71) Applicants: SALT INTERNATIONAL CORP., New Taipei (TW); IMAGINATION BROADWAY LTD., New Taipei (TW)

(72) Inventors: Shang-Li Lee, New Taipei (TW); Ko-Hao Ting, New Taipei (TW); Meng-Chien Liu, New Taipei (TW)

(73) Assignees: SALT INTERNATIONAL CORP., New Taipei (TW); IMAGINATION BROADWAY LTD., New Taipei (TW)

( * ) Notice: Subject to any disclaimer, the term of this patent is extended or adjusted under 35 U.S.C. 154(b) by 51 days.

(21) Appl. No.: 15/786,247

(22) Filed: Oct. 17, 2017

(65) Prior Publication Data

US 2018/0113530 A1    Apr. 26, 2018

(30) Foreign Application Priority Data

Oct. 21, 2016 (TW) .............................. 105134183 A

(51) Int. Cl.
*G06F 3/041*    (2006.01)
*G06F 3/044*    (2006.01)

(52) U.S. Cl.
CPC ............ *G06F 3/044* (2013.01); *G06F 3/0412* (2013.01); *G06F 3/0416* (2013.01); *G06F 3/0418* (2013.01); *G06F 2203/04104* (2013.01); *G06F 2203/04112* (2013.01)

(58) Field of Classification Search
CPC ...... G06F 3/044; G06F 3/0418; G06F 3/0416; G06F 3/0412; G06F 2203/04112; G06F 2203/04104
See application file for complete search history.

(56) References Cited

U.S. PATENT DOCUMENTS

| | | | |
|---|---|---|---|
| 2013/0207935 A1* | 8/2013 | Toda | G06F 3/0418 345/174 |
| 2014/0092048 A1* | 4/2014 | Yamamoto | G06F 1/1626 345/173 |
| 2014/0210791 A1* | 7/2014 | Hanauer | G06F 3/0416 345/174 |
| 2015/0049043 A1* | 2/2015 | Yousefpor | G06F 3/044 345/174 |
| 2018/0011596 A1* | 1/2018 | Korapati | G06F 3/0418 |

* cited by examiner

*Primary Examiner* — Amit Chatly
(74) *Attorney, Agent, or Firm* — Andrew M. Calderon; Roberts Mlotkowski Safran Cole & Calderon, P.C.

(57) ABSTRACT

A detection method for an irregular conductive matter in a touch event includes scanning a plurality of detection points to obtain a plurality of sensing signals of the detection points; computing a first signal summation of all positive signals among the sensing signals; obtaining a first change between the first signal summation and a previous first signal summation; computing a second signal summation of all negative signals among the sensing signals; obtaining a second change between the second signal summation and a previous second signal summation; setting a flag according to the first change and the second change when the first change and the second change are positive; clearing the flag according to the first change and the second change when the first change and the second change are negative; and disabling a reporting of at least one touch point when the flag exists.

16 Claims, 8 Drawing Sheets

CAPACITIVE SENSING DEVICE AND DETECTION METHOD FOR AN IRREGULAR CONDUCTIVE MATTER IN A TOUCH EVENT

CROSS-REFERENCE TO RELATED APPLICATION

This non-provisional application claims priority under 35 U.S.C. § 119(a) to Patent Application No. 105134183 filed in Taiwan, R.O.C. on Oct. 21, 2016, the entire contents of which are hereby incorporated by reference.

BACKGROUND

Technical Field

The instant disclosure relates to a capacitive sensing technique, in particular to a capacitive sensing device and method for an irregular conductive matter in a touch event.

Related Art

To enhance convenience in operation, more and more electronic devices are equipped with touch screens as the operating interface, such that a user can operate the device by directly touching the screen, thereby providing more convenient and friendly operating mode. Commonly, the touch screen includes a displaying device having displaying capabilities and a sensing device providing touch-sensing capabilities.

Based on structural characteristics and sensing modes, sensing devices can be divided into the following categories: impedance sensing devices; capacitive sensing devices; acoustic sensing devices; optical (e.g. infrared), sensing devices; and electromagnetic sensing devices. In particular, capacitive sensing devices do not need elastic material that reacts to external forces, are less responsive to ambient lighting condition, and have a simpler manufacturing process. Thus, most current touch screens use capacitive sensing devices.

When the capacitive sensing device has an irregular conductive matter region (such as water or other conductive matter), the equivalent circuit and equivalent parasitic capacitance between the axial conductive lines in the region change accordingly. Consequently, the control sensing circuit picks up a change in the electrical current or charge transferred on the axial conductive lines, leading to false determination and false motion. In another scenario, if the touched point is in the irregular conductive matter region, the control sensing circuit detects a relatively smaller amount of electrical current or charge transfer for the axial conductive lines at the touched location. Additionally, due to the irregular conductive matter region, the conductive lines are connected to adjacent axial conductive lines (connected to ground via the adjacent axial conductive lines), thus rendering the control sensing circuit unable to identify the touched location correctly.

SUMMARY

Therefore, how to effectively avoid false determination and wrong actions due to the irregular conductive matter(s) is one of the research goals undertaken by the industry.

In one embodiment, a detection method for an irregular conductive matter on a capacitive sensing device comprises scanning a plurality of detection points to obtain a plurality of sensing signals of the detection points; computing a first signal summation of all positive signals among the sensing signals; obtaining a first change between the first signal summation and a previous first signal summation; computing a second signal summation of all negative signals among the sensing signals; obtaining a second change between the second signal summation and a previous second signal summation; setting a flag according to the first change and the second change when the first change and the second change are positive; clearing the flag according to the first change and the second change when the first change and the second change are negative; and disabling a reporting of at least one of touch points when the flag exists, wherein each of the touch points is formed by a number of the detection points.

In one embodiment, a capacitive sensing device comprises a plurality of first electrode lines, a plurality of second electrode lines, and a sensing controller. The first electrode lines and the second electrode lines are intersected with each other and define a plurality of detection points configured as an array. The sensing controller is electrically connected to the first electrode lines and the second electrode lines. The sensing controller executes following steps: scanning the detection points to obtain a plurality of sensing signals of the detection points; computing a first signal summation of all positive signals among the sensing signals; obtaining a first change between the first signal summation and a previous first signal summation; computing a second signal summation of all negative signals among the sensing signals; obtaining a second change between the second signal summation and a previous second signal summation; setting a flag according to the first change and the second change when the first change and the second change are positive; clearing the flag according to the first change and the second change when the first change and the second change are negative; and disabling a reporting of at least one of touch points when the flag exists, wherein each of the touch points is formed by a number of the detection points.

Accordingly, the capacitive sensing device and the detection method for an irregular conductive matter in a touch event can determine if the touch event occurs in an irregular conductive matter to exclude false motion caused by the irregular conductive matter.

BRIEF DESCRIPTION OF THE DRAWINGS

The disclosure will become more fully understood from the detailed description given herein below for illustration only, and thus not limitative of the disclosure, wherein.

DETAILED DESCRIPTION

First, every embodiment of a detection method for an irregular conductive matter in a touch event according to the instant disclosure is applicable to a touch sensing apparatus. The touch sensing apparatus may be, but not limited to, a touch screen, a digital drawing tablet, a handwriting tablet, or an electronic device equipped with a touch sensing device. The electronic device may be, but not limited to, a smart phone, a personal navigation device (PND), a digital photo frame (DPF), an E-book, a notebook, a tablet or a pad. For the sake of clarity, in the following examples, the detection method is applied to a touch screen, but embodiments are not limited thereto. As to the "touch event" described hereinafter, for example, when the touch sensing apparatus is the touch screen, the touch event for the touch screen may be induced by the touch object such as a finger or a stylus. When the touch sensing apparatus is the digital drawing tablet, the touch event for the digital drawing tablet may be induced by the touch object such as a painting stylus. When the touch sensing apparatus is the handwriting tablet, the touch event for the handwriting tablet may be induced by the touch object such as a stylus or a finger.

Figure 1:
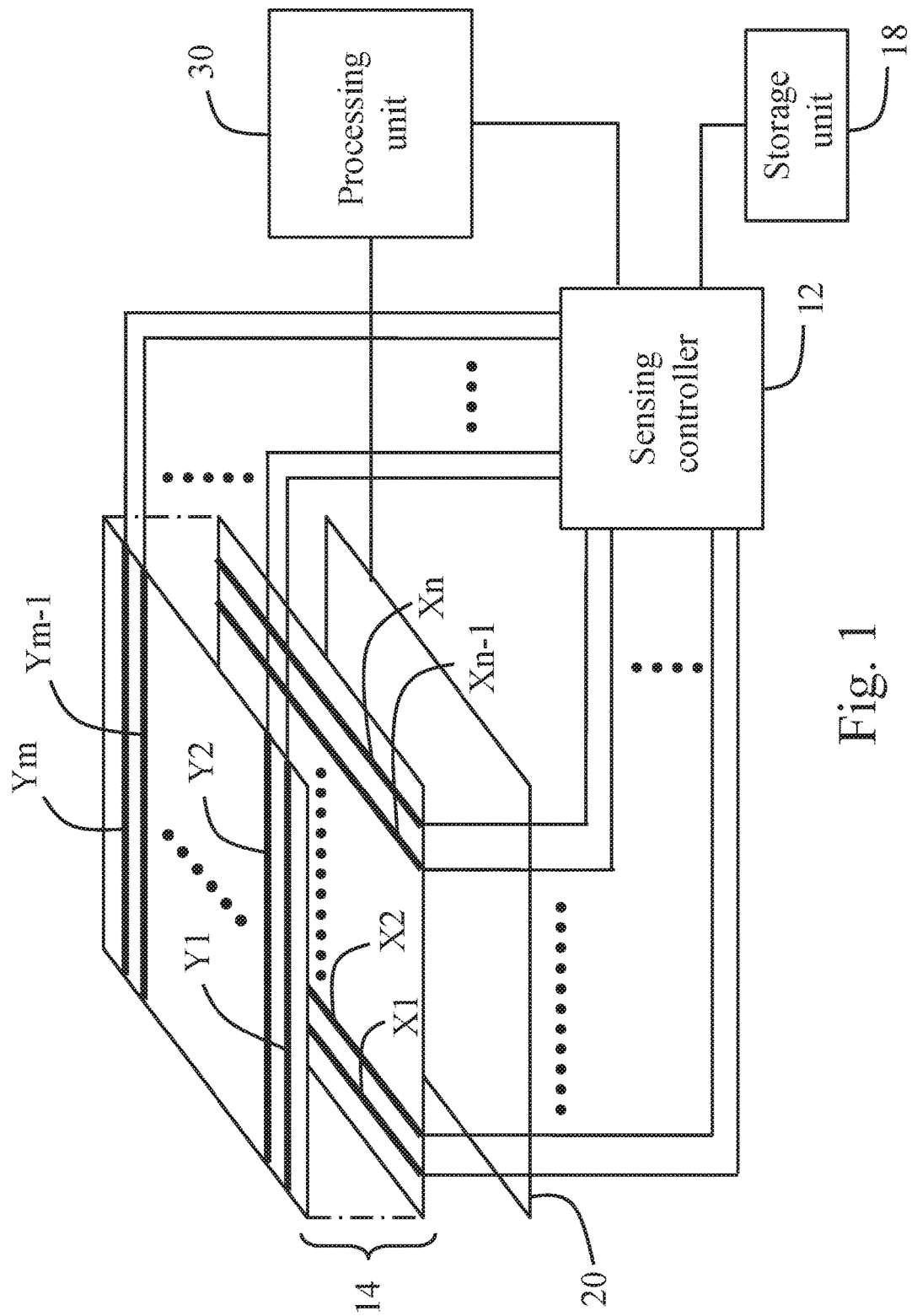
FIG. 1 illustrates a schematic view of a touch sensing apparatus with one embodiment of a capacitive sensing device.
Figure 2:
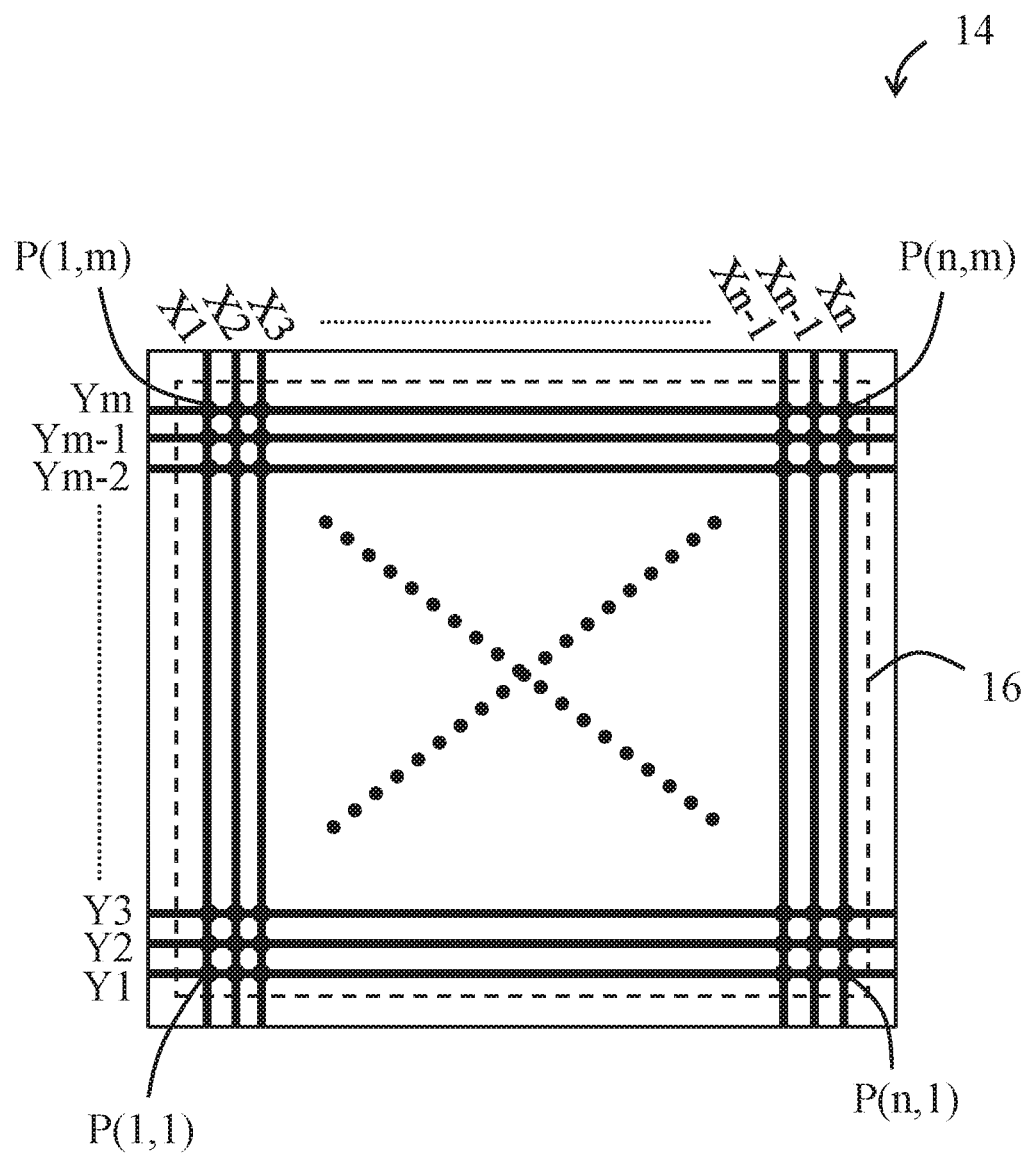
FIG. 2 illustrates a schematic view for one embodiment of a signal sensor in FIG. 1.

FIG. 1 illustrates a schematic view of a touch sensing apparatus with one embodiment of a capacitive sensing device. FIG. 2 illustrates a schematic view for one embodiment of a signal sensor in FIG. 1. In the forgoing descriptions, the touch sensing apparatus is an electronic device for illustrative purposes, but embodiments are not limited thereto.

Please refer to FIG. 1. The touch sensing apparatus comprises a capacitive sensing device, a display 20, and a processing unit 30. The capacitive sensing device comprises a sensing controller 12 and a signal sensor 14. The sensing controller 12 is connected to the signal sensor 14, and the signal sensor 14 is located on a display surface of the display 20. The processing unit 30 is electrically connected to the sensing controller 12 and the display 20. The signal sensor 14 comprises a plurality of electrode lines intersected with each other (e.g., first electrode lines X1, X2 to Xn-1, and Xn and second electrode lines Y1, Y2 to Ym-1, and Ym). Wherein, n and m are positive integers, and n may be equal to or not equal to m. The first electrode lines X1, X2 to Xn-1, and Xn and the second electrode lines Y1, Y2 to Ym-1, and Ym are electrically connected to the sensing controller 12.

From a top view of the electrode lines, the first electrode lines X1, X2 to Xn-1, and Xn are intersected with the respective second electrode lines Y1, Y2 to Ym-1, and Ym to define a plurality of detection points P(1,1)-P(n,m) configured as an array, as shown in FIG. 2. In other words, the first electrode lines X1, X2 to Xn-1, and Xn and the second electrode lines Y1, Y2 to Ym-1, and Ym jointly define a planar coordinate system. Based on the instant embodiment, the first electrode lines X1, X2 to Xn-1, and Xn and the second electrode lines Y1, Y2 to Ym-1, and Ym define a right-angle coordinate system (i.e., a Cartesian coordinate system), but is not limited thereto. For example, other possibilities include polar coordinate system, non-right angle coordinate system, or other planar coordinate systems. In some embodiments, the overlapping of the first electrode lines X1, X2 to Xn-1, and Xn and the second electrode lines Y1, Y2 to Ym-1, and Ym present a diamond shaped honey comb-like pattern, grid-like pattern, or palisade-like pattern.

In some embodiments, the first electrode lines X1, X2 to Xn-1, and Xn and the second electrode lines Y1, Y2 to Ym-1, and Ym may be respectively disposed on different planes; in other words, the first electrode lines X1, X2 to Xn-1, and Xn and the second electrode lines Y1, Y2 to Ym-1, and Ym are respectively disposed on different sensing layers. Wherein, an insulation layer may be, but not limited to, disposed between the sensing layers (not shown). In some other embodiments, the first electrode lines X1, X2 to Xn-1, and Xn and the second electrode lines Y1, Y2 to Ym-1, and Ym may be respectively disposed on a same plane; in other words, the electrode lines are on a single sensing layer.

In some embodiments, the first electrode lines X1, X2 to Xn-1, and Xn are emission electrode lines, and the second electrode lines Y1, Y2 to Ym-1, and Ym are reception electrode lines. In some other embodiments, the first electrode lines X1, X2 to Xn-1, and Xn are reception electrode lines, and the second electrode lines Y1, Y2 to Ym-1, and Ym are emission electrode lines.

In some embodiments, the sensing layers may be transparent or translucent. Therefore, by seeing through the sensing layers, contents displayed on the display 20 are visible to a user. In other words, light rays emitted from the display 20 can penetrate and pass through all the sensing layers to reach the eyes of the user. In some other embodiments, the sensing layers may be neither transparent nor translucent. For example, the sensing layers may be utilized in those touch sensing devices not having the display 20 such as an electronic graphics tablet or a handwriting tablet.

In some embodiments, the processing unit 30 may be an internal processor or a processor of an external device.

When the user touches the capacitive sensing apparatus, the capacitive sensing device detects touch events (touch operations), and the processing unit 30 performs a further process based on position information corresponding to the touch events. The contents of the further process are based on an application program of the touch sensing apparatus corresponding to the position of the display 20 where the touch events occur. For example, but not limited to, in the further process, the processing unit 30 starts a certain application in responsive to the touch events or the display 20 displays tracks of a stylus or a finger on the position where the touch event occur.

The region of the display 20 for showing information corresponds to a sensing area 16 of the signal sensor 14. The sensing area 16 is used for detecting whether a user has induced a touch event. Detection points P(1, 1) to P(n, m) are defined within the sensing area 16.

In this embodiment, the sensing controller 12 may utilize capacitive sensing technologies like self-capacitance detection or mutual capacitance detection to detect a touch operation of a user by the signal sensor 14. Besides the detection of a normal touch operation, the sensing controller 12 also performs a detection of an irregular conductive matter (e.g., water), to eliminate false motion due to the irregular conductive matter.

In an example that the water as the irregular conductive matter, water is a material forming a floating potential for the signal sensor 14, thus rendering the sensing controller 12 to generate positive and negative detection signals upon measuring the potential formed between water and the signal sensor 14. When a finger (or a touch sensing element) touches a region of the sensing area 16 where water exists, water forms a grounding potential through the finger and allows parts of the sensing signals become positive signals. In this case, the potential change of the region of the sensing area 16 where water exists is similar to that of the region of the sensing area 16 where a palm is located on; that is, positive signals in a massive area are generated. Further, when water contains salts, the sensing signals corresponding to the region of the sensing area 16 where salty water exists would have more positive signals.

Figure 3:
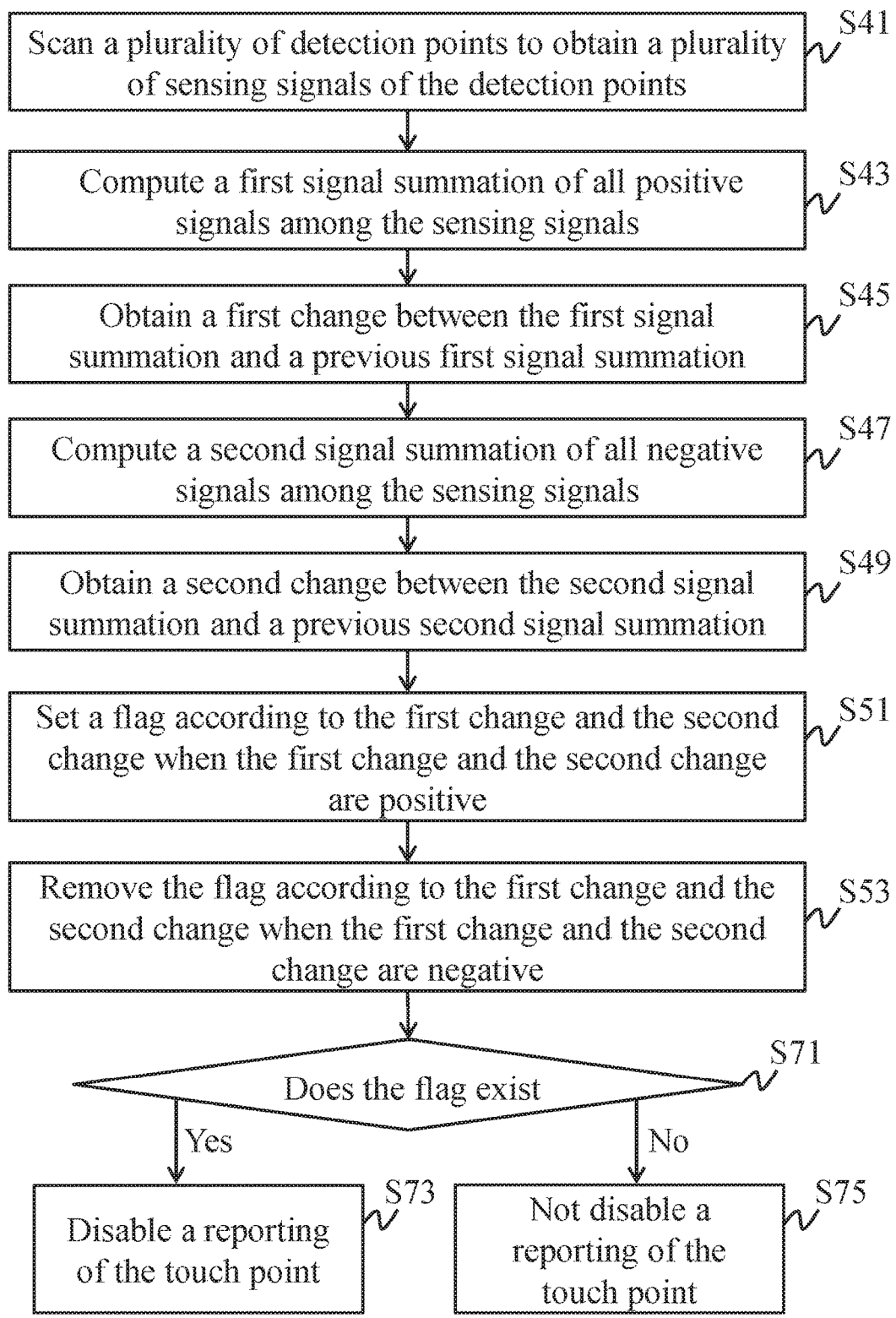
FIG. 3 illustrates a flowchart for a first embodiment of a detection method for an irregular conductive matter in a touch event according to the instant disclosure.

FIG. 3 illustrates a flowchart for a first embodiment of a detection method for an irregular conductive matter in a touch event according to the instant disclosure.

Please refer to FIG. 3. The sensing controller 12 performs scanning for the conductive wires to obtain the sensing signals of all the detection points P(1,1) to P(n,m) within the sensing area 16 (step S41). In one embodiment, the sensing controller 12 scans the signal of every detection point P(1,1) to P(n,m) (hereinafter, indicated by P), and the sensing controller 12 compares the scanned signals with the corresponding background value to obtain the sensing signals. In other words, the sensing signal is the difference between the scanned signal and the corresponding background value. Wherein, the background value corresponding to each of the detection points P may be a previous scanned signal or a default signal. When the scanned signal is greater than the background value, the sensing signal is a positive signal. On the contrary, when the scanned signal is less than or equal to the background value, the sensing signal is a negative signal.

Next, the sensing controller 12 computes a signal summation (hereinafter, called first signal summation) of all positive signals among the sensing signals of all the detection points P(1,1) to P(n,m) (step S43), and the sensing controller 12 obtains a change (hereinafter, called first change) between the first signal summation and a previous first signal summation (step S45). In one embodiment, the first change may be the largest change between several scans. In other words, in every scan, the sensing controller 12 records the computed first signal summation of all the positive signals. In one embodiment of step S45, after step S43, the sensing controller 12 would respectively compute the differences between a current first signal summation (i.e., the signal summation of all the positive signals in a current scan circle) and each of the previous k times first signal summations (i.e., the signal summations of all the positive signals in the previous k times scan circles) to obtain to-be-selected changes for a k number of positive signals. Then, a to-be-selected change having the largest value among absolute values of the to-be-selected changes for a k number of positive signals is defined as the first change. Wherein, k is a positive integer greater than or equal to 1. In one embodiment, k may be in the range from 2 to 9. Specifically, k may be in the range from 3 to 5. Supposed that k equals to 3 and the first signal summations of the positive signals in seven scans (times of scan t=1 to 7) are [1, 1, 80, 150, 150, 150, 150]. In such case, the first change is 0 at t=2, the first change is 79 at t=3, the first change is 149 at t=4, the first change is 149 at t=5, the first change is 70 at t=6, and the first change is 0 at t=7.

Moreover, the sensing controller 12 also computes a signal summation (hereinafter, called second signal summation) of all negative signals among the sensing signals of all the detection points P(1,1) to P(n,m) (step S47), and the sensing controller 12 obtains a change (hereinafter, called second change) between the second signal summation and a previous second signal summation (step S49). In one embodiment, the second change may be the largest change between several scans. In other words, in every scan, the sensing controller 12 records the computed second signal summation of all the negative signals. In one embodiment of step S49, after step S47, the sensing controller 12 would respectively compute the differences between a current second signal summation (i.e., the signal summation of all the negative signals in a current scan circle) and each of the previous j times second signal summations (i.e., the signal summations of all the negative signals in the previous j times scan circles) to obtain to-be-selected changes for a j number of negative signals. Then, a to-be-selected change having the largest change value among the to-be-selected changes for a j number of negative signals is defined as the second change. Wherein, j is a positive integer greater than or equal to 1. In one embodiment, j may be in the range from 2 to 9. Specifically, j may be in the range from 3 to 5. In this embodiment, k may be equal to or not equal to j.

Wherein, when the first change and the second change are positive (positive value), the sensing controller 12 sets a flag in a storage unit 18 according to the first change and the second change (step S51). When the first change and the second change are negative (negative value), the sensing controller 12 clears the flag from the storage unit according to the first change and the second change. Wherein the storage unit 18 may be disposed outside of the sensing controller 12 or may be built in the sensing controller 12 (not shown).

Figure 4:
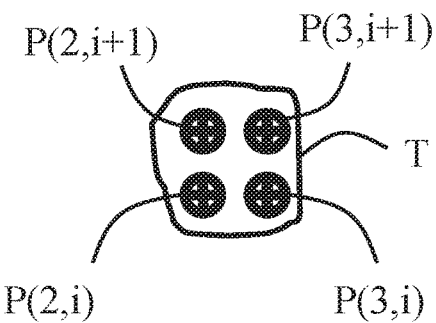
FIG. 4 illustrates a schematic view for one embodiment of a touch event for one embodiment of the capacitive sensing device.

Furthermore, the sensing controller 12 determines if the storage unit 18 stores the flag (step S71). When the flag exists (i.e. the state of the flag is set), the sensing controller 12 disables a reporting of the touch point (step S73); conversely, when the flag does not exist, the sensing controller does not disable the reporting of the touch point (step S75). In this embodiment, each of the touch points T1 is formed by a number of detection points P(2, i), P(2, i+1), P(3, i), and P(3, i+1) that are greater than a touch threshold, as shown in FIG. 4. In this embodiment, the term "report" means the sensing controller 12 outputs position information of the touch point T1; while "disable the reporting" means the sensing controller 12 does not output the position information of the touch point T1 even when the touch point T1 satisfies the reporting condition (e.g., the touch point T1 is detected in consecutive several scan circles).

In some embodiments, when one of the first change and the second change is positive and the other of the first change and the second change is negative, the sensing controller 12 verifies each of the sensing signals according to the touch threshold.

Figure 5:
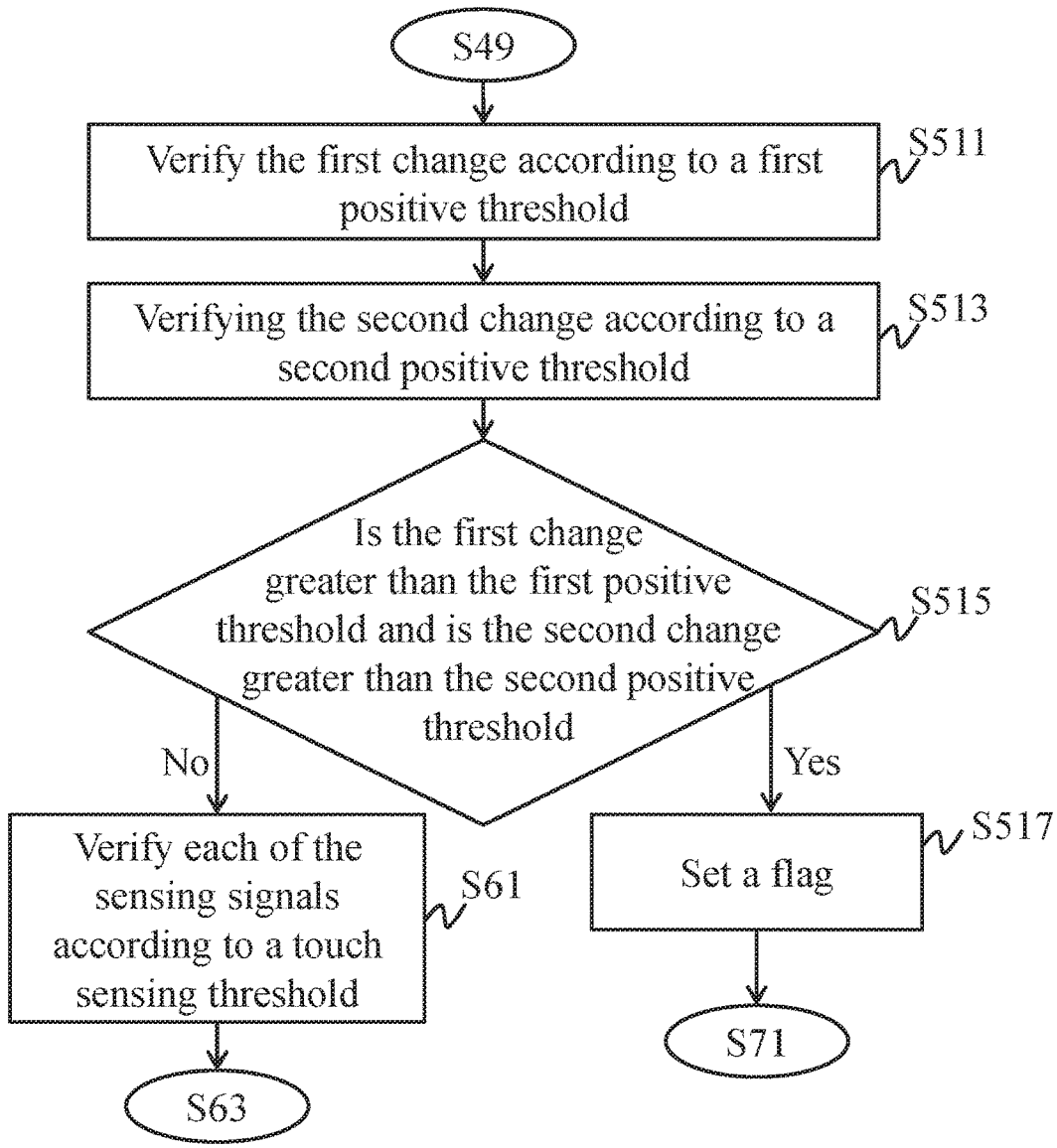
FIG. 5 illustrates a flowchart of one embodiment of step S51.

Please refer to FIG. 5. In one embodiment of step S51, when the first change and the second change are positive, the sensing controller 12 verifies the first change according to a first positive threshold (step S511) to check if the value (absolute value of the positive value) of the first change is greater than the first positive threshold (step S515). And, when the first change and the second change are positive, the sensing controller 12 also verifies the second change according to a second positive threshold (step S513) to check if the value (absolute value of the positive value) of the second change is greater than the second positive threshold (step S515). When the value of the first change is greater than the first positive threshold and the value of the second change is greater than the second positive threshold, the sensing controller 12 sets the flag in the storage unit 18 (step S517). Conversely, when the value of the first change is not greater than the first positive threshold and/or the value of the second change is not greater than the second positive threshold, the sensing controller 12 verifies each of the sensing signals according to the touch threshold (step S61). In other words, when the value of the first change is not greater than the first positive threshold, or when the value of the second change is not greater than the second positive threshold, or when both the value of the first change is not greater than the first positive threshold and the value of the second change is not greater than the second positive threshold, the sensing controller 12 verifies each of the sensing signals according to the touch threshold.

Figure 6:
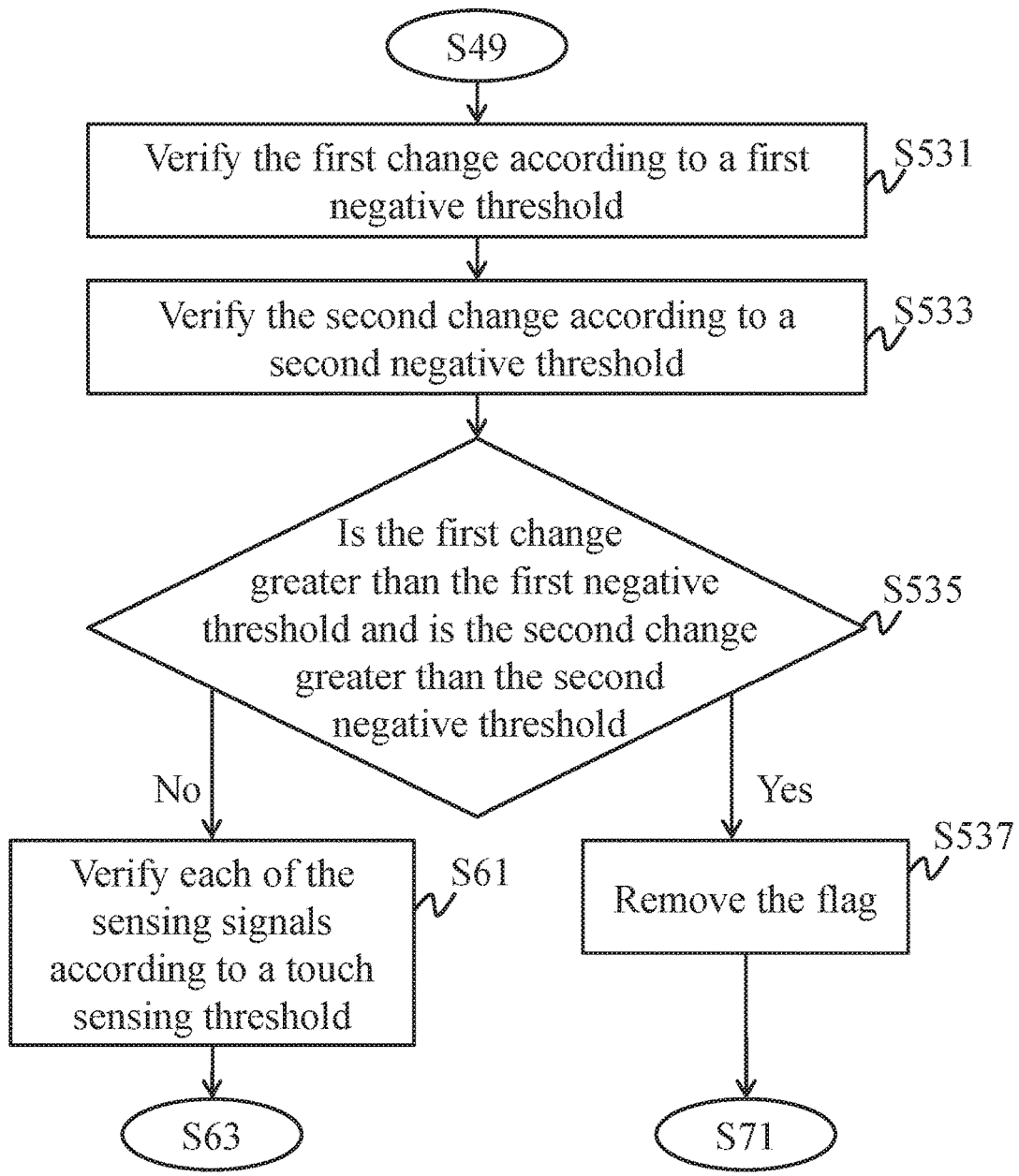
FIG. 6 illustrates a flowchart of one embodiment of step S53.

Please refer to FIG. 6. In one embodiment of step S53, when the first change and the second change are negative, the sensing controller 12 verifies the first change according to a first negative threshold (step S531) to check if the value (absolute value of the negative value) of the first change is greater than the first negative threshold (step S535). And, when the first change and the second change are negative, the sensing controller 12 also verifies the second change according to a second negative threshold (step S533) to check if the value (absolute value of the negative value) of the second change is greater than the second negative threshold (step S535). When the value of the first change is greater than the first negative threshold and the value of the second change is greater than the second negative threshold, the sensing controller 12 clears the flag from the storage unit 18 (step S537). Conversely, when the value of the first change is not greater than the first negative threshold and/or the value of the second change is not greater than the second negative threshold, the sensing controller 12 verifies each of the sensing signals according to the touch threshold (step S61).

For example, supposed that k equals to 2, the first signal summations of the positive signals are [1, 80, 150, 150, 1, 1] at t=1 to 6, and the second signal summations of the negative signals are [−150, −80, −1, −80, −150, −80] at t=1 to 6. In such case, the first change is 79 at t=2, the first change is 149 at t=3, the first change is 70 at t=4, the first change is −149 at t=5, and the first change is −149 at t=6. And, the second change is 70 at t=2, the second change is 149 at t=3, the second change is −70 at t=4, the second change is −149 at t=5, and the second change is 70 at t=6. When t=2, the sensing controller 12 verifies the first change according to a first positive threshold and verifies the second change according to a second positive threshold. When t=3, the sensing controller 12 continuously verifies the first change according to a first positive threshold and verifies the second change according to a second positive threshold. When t=4, the sensing controller 12 verifies each of the sensing signals according to the touch threshold. When t=5, the sensing controller 12 verifies the first change according to a first negative threshold and verifies the second change according to a second negative threshold. When t=6, the sensing controller 12 verifies each of the sensing signals according to the touch threshold.

Figure 7:
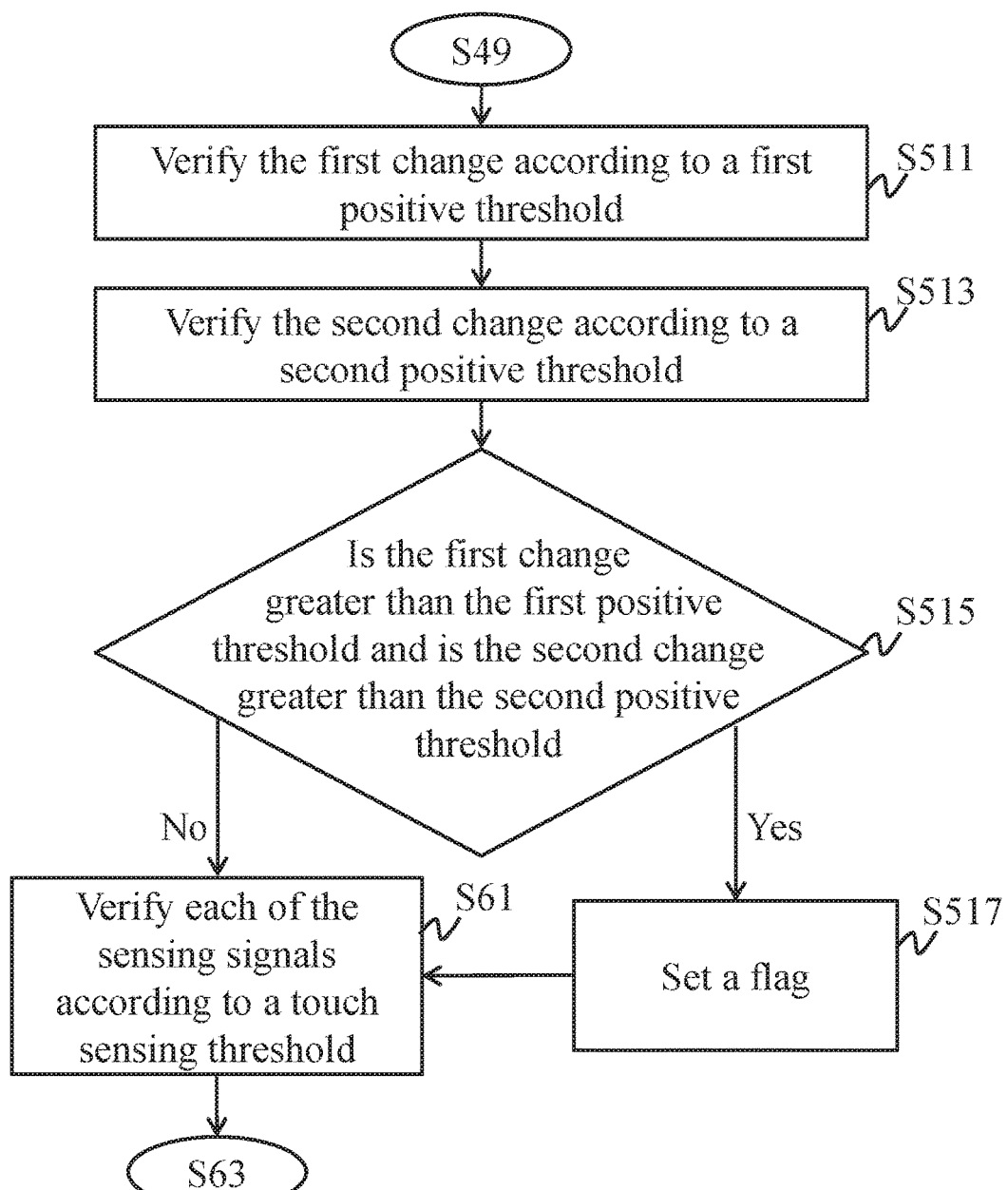
FIG. 7 illustrates a flowchart of another embodiment of step S51.
Figure 8:
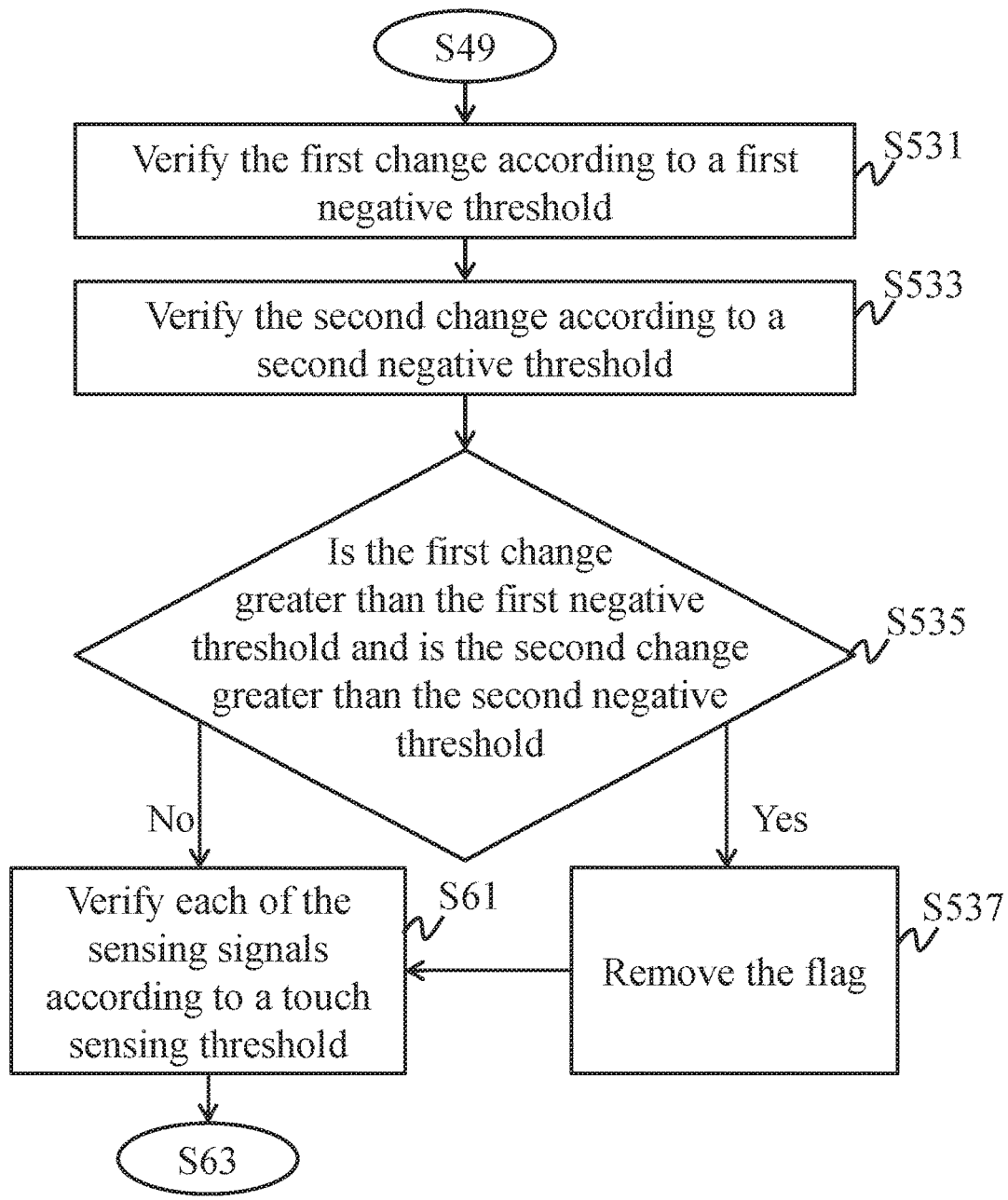
FIG. 8 illustrates a flowchart of another embodiment of step S53.

Please refer to FIGS. 7 and 8. In one embodiment, after step S517 or S537, the sensing controller 12 may verify each of the sensing signals according to the touch threshold (step S61).

Figure 9:
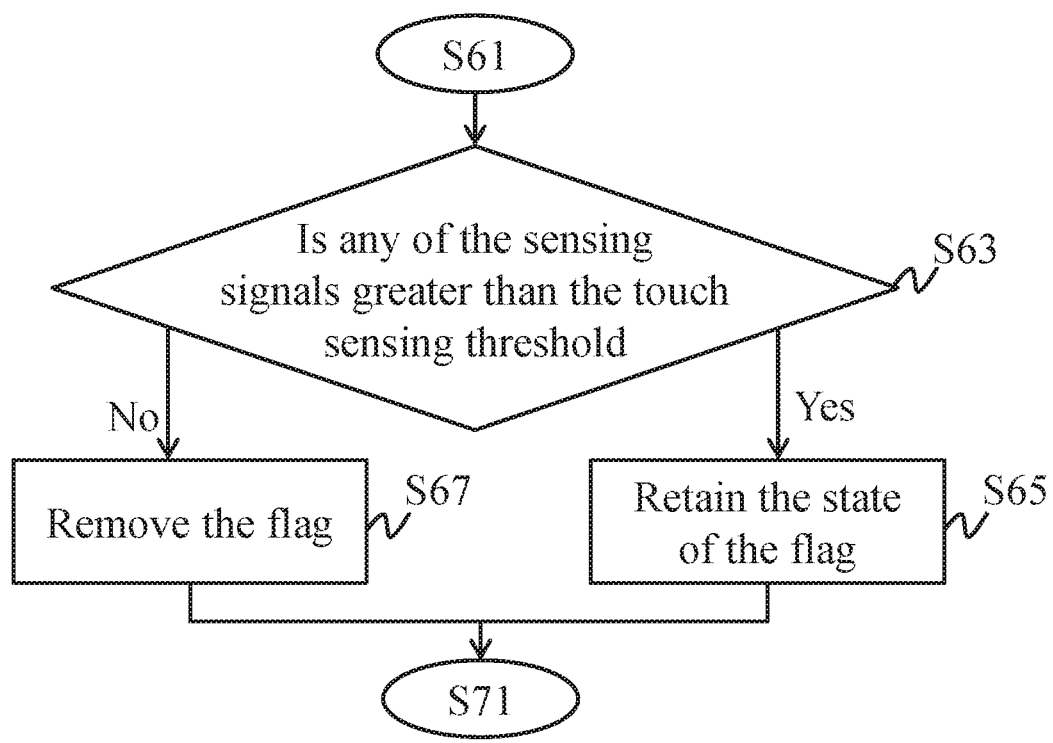
FIG. 9 illustrates a flowchart of one embodiment of a determination for the touch threshold and the sensing signals.

Please refer to FIG. 9, in any forgoing embodiment of step S61, the sensing controller 12 would determine if any of the sensing signals is greater than the touch threshold (step S63).

When any of the sensing signals is greater than the touch threshold, the sensing controller 12 retains the state of the flag and continues confirming the state of the flag (i.e., executes step S71). In other words, in step S65, when the storage unit 18 already stores the flag, the sensing controller 12 does not clear the flag from the storage unit 18; that is, the sensing controller 12 retains the flag storing in the storage unit 18. Conversely, in the step S65, when the storage unit 18 does not store the flag, the sensing controller 12 does not change the content stored in the storage unit 18; that is, the sensing controller 12 retains the storage unit 18 free of the flag.

However, when the sensing signals of all the detection points P(1,1) to P(n,m) are not greater than the touch threshold, the sensing controller 12 clears the flag from the storage unit 18 (step S67) and continues confirming the state of the flag (i.e., executes step S71).

In one embodiment, the touch threshold is greater than zero. Wherein, the touch threshold may be a finger signal.

In this embodiment, the sensing controller 12 stores the computed first signal summations and the computed second signal summations in the storage unit for computing a first change and a second change for next detection.

It is understood that, the execution order for each of the steps is not limited by the order presented in the foregoing paragraphs, and the execution order for the steps can be properly adjusted according to the contents of the steps. For example, the step S47 may be executed before the step S43 or the step S45, or the step 47 may be executed with the step S43/S45 at the same time. In other words, the step S47 may be executed at any moment after the step S41 and before the step S49.

In some embodiments, the storage unit 18 may be implemented by one or more memory elements. The memory elements may be a read-only memory (ROM), a random-access memory (RAM), a nonvolatile memory, a volatile memory, a static memory, a dynamic memory, a flash memory, and/or any apparatus for storing digital information.

In some embodiments, the detection method for an irregular conductive matter in a touch event may be implemented by a computer program product. Hence, when a computer (i.e., any touch sensing apparatus) loads and executes the program, the detection method for an irregular conductive matter in a touch event according to one embodiment of the instant disclosure can be achieved. In some embodiments, the computer program product may be a readable record medium, and the program stored in the readable record medium for being loaded by a computer. In some embodiments, the program itself may be the computer program product and transmitted to a computer wiredly or wirelessly.

Accordingly, the capacitive sensing device and the detection method for an irregular conductive matter in a touch event can determine if the touch event occurs in an irregular conductive matter to exclude false motion caused by the irregular conductive matter.

What is claimed is:

1. A detection method for an irregular conductive matter in a touch event, comprising: scanning a plurality of detection points to obtain a plurality of sensing signals of the detection points; computing a first signal summation of all positive signals among the sensing signals; obtaining a first change between the first signal summation and a previous first signal summation; computing a second signal summation of all negative signals among the sensing signals; obtaining a second change between the second signal summation and a previous second signal summation; setting a flag according to the first change and the second change when the first change and the second change are positive; clearing the flag according to the first change and the second change when the first change and the second change are negative; and disabling a reporting of at least one of touch points when the flag exists, wherein each of the touch points is formed by a plurality of ones of the detection points; and further comprising: verifying each of the sensing signals according to a touch threshold when one of the first change and the second change is positive and the other of the first change and the second change is negative; retaining a state of the flag when any of the sensing signals is greater than the touch threshold; and clearing the flag when all the sensing signals are not greater than the touch threshold.

2. The detection method according to claim 1, wherein when the first change and the second change are positive, the step of setting a flag according to the first change and the second change comprises:
verifying the first change according to a first positive threshold;
verifying the second change according to a second positive threshold;
setting the flag when a value of the first change is greater than the first positive threshold and a value of the second change is greater than the second positive threshold;
verifying each of the sensing signals according to a touch threshold when the value of the first change is not greater than the first positive threshold;
verifying each of the sensing signals according the touch threshold when the value of the second change is not greater than the second positive threshold;
retaining a state of the flag when any of the sensing signals is greater than the touch threshold; and
clearing the flag when all the sensing signals are not greater than the touch threshold.

3. The detection method according to claim 2, wherein when the value of the first change is greater than the first positive threshold and the value of the second change is greater than the second positive threshold, the method further comprises:
verifying each of the sensing signals according to the touch threshold.

4. The detection method according to claim 1, wherein when the first change and the second change are negative, the step of clearing the flag according to the first change and the second change comprises:
verifying the first change according to a first negative threshold;
verifying the second change according to a second negative threshold;
clearing the flag when a value of the first change is greater than the first negative threshold and a value of the second change is greater than the second negative threshold;
verifying each of the sensing signals according to a touch threshold when the value of the first change is not greater than the first negative threshold;
verifying each of the sensing signals according to the touch threshold when the value of the second change is not greater than the second negative threshold;
retaining a state of the flag when any of the sensing signals is greater than the touch threshold; and
clearing the flag when all the sensing signals are not greater than the touch threshold.

5. The detection method according to claim 1, wherein when the value of the first change is greater than the first negative threshold and the value of the second change is greater than the second negative threshold, the method further comprises:
verifying each of the sensing signals according to the touch threshold.

6. The detection method according to claim 1, wherein the touch threshold is a finger signal.

7. The detection method according to claim 2, wherein the touch threshold is a finger signal.

8. The detection method according to claim 4, wherein the touch threshold is a finger signal.

9. A capacitive sensing device, comprising: a plurality of first electrode lines; a plurality of second electrode lines intersected with the first electrode lines, the first electrode lines and the second electrode lines defining a plurality of detection points configured as an array; and a sensing controller electrically connected to the first electrode lines and the second electrode lines, wherein the sensing controller executes: scanning the detection points to obtain a plurality of sensing signals of the detection points; computing a first signal summation of all positive signals among the sensing signals; obtaining a first change between the first signal summation and a previous first signal summation; computing a second signal summation of all negative signals among the sensing signals; obtaining a second change between the second signal summation and a previous second signal summation; setting a flag according to the first change and the second change when the first change and the second change are positive; clearing the flag according to the first change and the second change when the first change and the second change are negative; and disabling a reporting of at least one of touch points when the flag exists, wherein each of the touch points is formed by a number of the detection points; and wherein the sensing controller further executes: verifying each of the sensing signals according to a touch threshold when one of the first change and the second change is positive and the other of the first change and the second change is negative; retaining a state of the flag when any of the sensing signals is greater than the touch threshold; and clearing the flag when all the sensing signals are not greater than the touch threshold.

10. The capacitive sensing device according to claim 9, wherein in the step of setting the flag according to the first change and the second change, the sensing controller sets the flag when a value of the first change is greater than a first positive threshold and a value of the second change is greater than a second positive threshold, the sensing controller verifies each of the sensing signals according to a touch threshold when at least one of the value of the first change is not greater than the first positive threshold and the value of the second change is not greater than the second positive threshold, the sensing controller retains a state of the flag when any of the sensing signals is greater than the touch threshold, and the sensing controller clears the flag when all the sensing signals are not greater than the touch threshold.

11. The capacitive sensing device according to claim 10, wherein when the value of the first change is greater than the first positive threshold and the value of the second change is greater than the second positive threshold, the sensing controller further executes: verifying each of the sensing signals according to the touch threshold, retaining the state of the flag when any of the sensing signals is greater than the touch threshold, and clearing the flag when all the sensing signals are not greater than the touch threshold.

12. The capacitive sensing device according to claim 9, wherein in the step of clearing the flag according to the first change and the second change, the sensing controller clears the flag when a value of the first change is greater than a first negative threshold and a value of the second change is greater than a second negative threshold, the sensing controller verifies each of the sensing signals according to a touch threshold when at least one of the value of the first change is not greater than the first negative threshold and the value of the second change is not greater than the second negative threshold, the sensing controller retains a state of the flag when any of the sensing signals is greater than the touch threshold, and the sensing controller clears the flag when all the sensing signals are not greater than the touch threshold.

13. The capacitive sensing device according to claim 12, wherein when the value of the first change is greater than the first negative threshold and the value of the second change is greater than the second negative threshold, the sensing controller further executes: verifying each of the sensing signals according to the touch threshold, retaining the state of the flag when any of the sensing signals is greater than the touch threshold, and clearing the flag when all the sensing signals are greater than the touch threshold.

14. The capacitive sensing device according to claim 9, wherein the touch threshold is a finger signal.

15. The capacitive sensing device according to claim 10, wherein the touch threshold is a finger signal.

16. The capacitive sensing device according to claim 12, wherein the touch threshold is a finger signal.

\* \* \* \* \*